United States Patent
Eichholz et al.

(10) Patent No.: US 10,050,788 B2
(45) Date of Patent: Aug. 14, 2018

(54) METHOD FOR READING AN IDENTIFICATION DOCUMENT IN A CONTACTLESS MANNER

(71) Applicant: GIESECKE & DEVRIENT GMBH, Munich (DE)

(72) Inventors: Jan Eichholz, Munich (DE); Gisela Meister, Munich (DE); Thomas Aichberger, Oberhaching (DE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 81 days.

(21) Appl. No.: 14/364,222

(22) PCT Filed: Dec. 18, 2012

(86) PCT No.: PCT/EP2012/005238
§ 371 (c)(1),
(2) Date: Jun. 10, 2014

(87) PCT Pub. No.: WO2013/091840
PCT Pub. Date: Jun. 27, 2013

(65) Prior Publication Data
US 2014/0333416 A1    Nov. 13, 2014

(30) Foreign Application Priority Data
Dec. 20, 2011    (DE) .......... 10 2011 121 567

(51) Int. Cl.
*G05B 19/00* (2006.01)
*H04L 9/32* (2006.01)
(Continued)

(52) U.S. Cl.
CPC ................ *H04L 9/32* (2013.01); *G06F 21/35* (2013.01); *G06K 19/0724* (2013.01);
(Continued)

(58) Field of Classification Search
CPC ....... H04L 9/32; H04L 9/3215; H04L 9/3226; H04L 9/3234; G06K 19/0724; G06K 19/07767; G06F 21/35
(Continued)

(56) References Cited

U.S. PATENT DOCUMENTS 6,035,381 A * 3/2000 Mita .................. G06F 12/1466
                                                  711/145
7,837,119 B2    11/2010 Graf et al.
(Continued)

FOREIGN PATENT DOCUMENTS

DE            10037176 A1    2/2002
DE         102005038092 A1    2/2007
(Continued)

OTHER PUBLICATIONS

Christianson et al., "Multi-Channel Key Agreement Using Encrypted Public Key Exchange," Security Protocols, Apr. 18, 2007, pp. 133-138.
(Continued)

*Primary Examiner* — Zhen Y Wu
(74) *Attorney, Agent, or Firm* — Justin J. Cassell; Workman Nydegger

(57) ABSTRACT

The invention creates a method for the contactless readout of an electronic identification document by means of a terminal, wherein in a data reading step encrypted identification data from a data memory are transmitted to the terminal, and in a key reading step the data key with which the identification data can be decrypted is transmitted to the terminal, and in the terminal the identification data are decrypted with the data key. The data reading step is carried out employing a long-range radio connection, and the key reading step is carried out employing a short-range radio connection.

10 Claims, 2 Drawing Sheets

(51) Int. Cl.
*G06K 19/07* (2006.01)
*G06K 19/077* (2006.01)
*G06F 21/35* (2013.01)

(52) U.S. Cl.
CPC ...... *G06K 19/07767* (2013.01); *H04L 9/3215* (2013.01); *H04L 9/3226* (2013.01); *H04L 9/3234* (2013.01)

(58) Field of Classification Search
USPC .................................................... 340/5.86
See application file for complete search history.

(56) References Cited

U.S. PATENT DOCUMENTS

| | | | |
|---|---|---|---|
| 2005/0076216 A1 | 4/2005 | Nyberg | |
| 2005/0146006 A1* | 7/2005 | Yamazaki | G06K 19/07749 257/679 |
| 2006/0133609 A1* | 6/2006 | Rodriguez | G11B 20/00086 380/201 |
| 2007/0046467 A1* | 3/2007 | Chakraborty | G06K 7/0008 340/572.1 |
| 2007/0063055 A1 | 3/2007 | Graf et al. | |
| 2007/0178882 A1 | 8/2007 | Teunissen et al. | |
| 2007/0233612 A1* | 10/2007 | Barrus | G06Q 10/10 705/71 |
| 2008/0089519 A1* | 4/2008 | Ekberg | H04W 12/04 380/270 |
| 2008/0157927 A1* | 7/2008 | Soppera | H04L 9/3263 340/10.1 |
| 2008/0258864 A1* | 10/2008 | Hattori | G06K 7/0008 340/5.8 |
| 2009/0073070 A1* | 3/2009 | Rofougaran | H04B 5/0012 343/793 |
| 2009/0090777 A1 | 4/2009 | Ness | |
| 2009/0091427 A1* | 4/2009 | Shiotsu | G06K 19/0723 340/10.1 |
| 2009/0125084 A1* | 5/2009 | Juels | A61B 5/0031 607/60 |
| 2010/0045425 A1* | 2/2010 | Chivallier | A61B 5/0002 340/5.8 |
| 2011/0275316 A1 | 11/2011 | Suumaki et al. | |
| 2013/0293453 A1* | 11/2013 | Hwang | G06F 3/03 345/156 |

FOREIGN PATENT DOCUMENTS

| | | |
|---|---|---|
| WO | 2004090800 A2 | 10/2004 |
| WO | 2011146492 A2 | 11/2011 |

OTHER PUBLICATIONS

German Search Report for corresponding German Application No. 102011121567.4, dated Aug. 8, 2012.
International Preliminary Report on Patentability for corresponding International PCT Application No. PCT/EP2012/005238, dated Jun. 24, 2014.
International Search Report for corresponding International PCT Application No. PCT/EP2012/005238, dated Apr. 2, 2013.

* cited by examiner

METHOD FOR READING AN IDENTIFICATION DOCUMENT IN A CONTACTLESS MANNER

BACKGROUND

The invention relates to a method for the accelerated contactless readout of an electronic identification document by means of a terminal.

An electronic identification document within the meaning of the invention comprises at least a microprocessor chip in which identification data of the person to whom the identification document is allocated are stored in a form encrypted with a data key, and a key memory in which the key employed for encrypting the identification data is stored. As electronic identification document particularly an electronic passport or an electronic identification card (e.g. electronic identity card) can be provided.

Electronic identification documents are read out in contactless fashion in large quantities by terminals (writing/reading devices), e.g. at border controls or other control stations, such as provided e.g. at airports, for the purpose of identity checking Therein the identification data from the data memory of the identification document are transmitted in contactless fashion to the terminal, decrypted with the key somewhere, and checked in the terminal.

Recommended mechanisms for secured communication between machine-readable travel documents, such as e.g. electronic passports, and corresponding terminals are described in the Technical Guideline TR-03110, version V 2.05, of the Bundesamt für Sicherheit in der Informationstechnik (BSI, Federal Agency for Security in Information Technology) (BSI Technical Guideline TR-03110, version V 2.05; Technische Richtlinie TR-03110, Version V 2.05; hereinafter referred to as BSI TR-03110). In the BSI TR-03110 in particular mechanisms are described for authentication between the terminal and a microprocessor chip of the travel document, as well as mechanisms for agreeing and deriving common session keys between the terminal and the microprocessor chip of the machine-readable travel document. In BSI TR-03110 in chapter 4 there is stated in particular: in chapter 4.2 the PACE protocol (PACE=Password Authenticated Connection Establishment) describing the mutual authentication and (optional EC, elliptic curve) Diffie-Hellman key agreement for agreeing session keys between the microprocessor chip and the terminal; in chapter 4.3 the chip authentication, with an authentication of the microprocessor chip to the terminal and agreement of session keys from which data keys can be derived. Therein both the microprocessor chip and the terminal generate respectively a first session key KMAC, which is employed for authentication between the chip and the terminal, and generate a second session key KENC, from which subsequently a transport key KSE is derived, with which data to be transmitted between the chip and the terminal are encrypted.

DE 10 2005 038 092 A1 discloses a method for the machine-checking of data electronically stored in a passport book.

DE 100 37 176 C2 discloses an identity card as electronic identification document, having an optical memory and an integrated circuit, wherein in the optical memory personalized data are stored in encrypted form, encrypted with a cryptographic key that is stored in the integrated circuit of the identity card. The identity card is to be read out by an external reading/writing device (terminal). For this purpose the integrated circuit carries out an authentication check of the writing/reading device and, after positive authentication check, releases the key for transmission to the writing/reading device The personalized data stored in encrypted form in the optical memory are transmitted to the writing/reading device for decryption with the key.

An identity check by means of electronic identification documents with the method described in DE 100 37 176 C2 is time-consuming, since an authentication of the terminal must be carried out first, then the key must be read out, and finally the identification data must be read out and decrypted.

The readout of integrated circuits in electronic identification documents usually takes place in a contactless fashion using RFID technology (RFID: radio-frequency identification) in the short-range radio range, more exactly in the proximity coupling range that comprises ranges of up to maximally around 15 centimeters, at a transmission frequency of mostly 13.56 MHz, corresponding to ranges of around 7 to 15 centimeters. The communication for identification cards in the short-range proximity coupling radio range is standardized in ISO/IEC 14443. The short range offers protection against the spying out of data while they are being radio-transmitted.

Especially in the area of logistics and warehousing by means of RFID labels, contactless communication in the long-range radio range is employed, with operating frequencies in the area of a few gigahertz and ranges of a few meters, typically 3-6 meters. For communication between electronic devices long-range radio connections in the UHF range are employed, with operating frequencies within the area of a small number of GHz, and ranges within the area of a few tens of meters up to a few hundred meters, e.g. WLAN (Wireless Local Area Network), with an operating frequency of e.g. 2.4 GHz or 5 GHz, or IrDA (Infrared Data Association). The long ranges facilitate an interception of transmitted data during the radio transmission, for which reason long-range radio connections are disadvantageous for the transmission of security-critical data.

SUMMARY

The invention is based on the object of creating a method for the accelerated contactless readout of an electronic identification document by means of a terminal, which is fast and at the same time secure.

In the method according to claim 1, in the data reading step, the encrypted identification data forming a comparatively large amount of data, are first transmitted via a long-range radio connection. This can take place for example while the owner of the identification document stands in a queue at a checkpoint where the identification document is to be checked. Thereby the large data amount of the identification data can be read out during a conventionally unutilized period of time, e.g. while waiting in the queue. The particularly security-critical transmission of the data key, with which the encrypted identification data can be decrypted, to the terminal, takes place subsequently via a short-range radio connection. Through the small range of the short-range radio connection good protection against an abusive spying out of the data key is ensured while it is in the air, i.e. is being radio-transmitted. As a rule, the data-key transmission can take place only after the owner has consciously submitted the identification document at the checkpoint.

Therefore according to claim 1 a method is created for the accelerated readout of an electronic identification document by means of a terminal, which is fast and secure at the same time.

The key memory is accessible for a microprocessor (chip) of the identification document. The data key is for example a symmetric key with which the identification data were encrypted.

As long-range radio connection optionally a radio connection is provided having a range from the area of approximately 1 meter to approximately a few hundred meters, and/or with an operating frequency from the area of approximately 0.3 GHz to approximately 10 GHz, preferably approximately 2 GHz to approximately 6 GHz, e.g. 2.4 GHz or 5 GHz, e.g. UHF-RFID or WLAN or IrDA.

As short-range radio connection optionally a radio connection is provided having a range from the area of approximately 1 centimeter to approximately 15 centimeters and/or with an operating frequency from the area of approximately 3 MHz to approximately 20 GHz, preferably at 13.56 GHz, e.g. in accordance with ISO/IEC 14443.

Optionally, the identification data are simply read out in the data reading step, without prior authentication, and without prior encryption of the identification data. Since the identification data are stored in the data memory in encrypted form, an unauthorized person reading out the identification data cannot decrypt them. The simple readout of this type thus offers limited security nevertheless.

Optionally, it is desired that an unauthorized person cannot read out the encrypted identification data either, or even has no possibility of accessing the data memory at all. Therefore, an authentication is optionally required for accessing the data memory, as described in the following. For this purpose the data memory must be connected to a microprocessor, whereas for simply reading out a data memory without microprocessor coupling is sufficient.

Optionally, the data memory is accessible for the microprocessor, e.g. if the data memory, the key memory and the microprocessor are integrated directly in the identification document, in particular on one single chip. Alternatively, the identification document has a further microprocessor, and the data memory is accessible for said microprocessor. For example, the data memory and the further microprocessor are arranged in an extra label or tag that is attached to the identification document, e.g. by adhesive bonding.

In embodiments where the data memory is accessible for the microprocessor, e.g. in the main document, or for the further microprocessor, e.g. in a tag or label, optionally a first authentication process is carried out in the data reading step, before the identification data are transmitted to the terminal, wherein at least one authentication is carried out between the microprocessor and the terminal or the further microprocessor and the terminal. Optionally, further a transport key is computed for encrypting the identification data to be transmitted, and the identification data are encrypted with the transport key. The encryption of the identification data with a transport key can be omitted optionally, since they are stored in the data memory in encrypted form anyway.

Optionally, in the key reading step, before the data key is transmitted to the terminal, an authentication process is carried out—that is referred to as "second" authentication process for the sake of differentiability—, wherein at least one authentication is carried out between the microprocessor chip and the terminal. Preferably, a key-transport key is computed additionally for encrypting the data key to be transmitted, and the data key is encrypted with the key-transport key before it is transmitted to the terminal. Optionally, the data key is stored in the key memory in unencrypted form, and should thus be encrypted before transmission to the terminal. If the data key is stored in the key memory in encrypted form, the additional encryption with the key-transport key can be omitted optionally. However, then the key for decrypting the data key must be made known to the terminal.

The "second" authentication process optionally can be the only authentication process, in the case that the previous data reading step takes place without authentication to the data memory or the allocated microprocessor.

Alternatively, an authentication is carried out only in the data reading step, in particular an authentication of the terminal to the data memory or, exactly, an authentication of the terminal to the microprocessor allocated to the data memory, and no authentication in the key reading step. This solution is conceivable since the key reading step is carried out via the short-range radio connection, and can consequently not be tapped so easily. Optionally, in the data reading step, a transport key is computed that is employed optionally only for encrypting the identification data for the data reading step, optionally only for encrypting the data key for the key reading step, optionally for both the encryption of the identification data and the encryption of the data key, respectively before the transmission of the data in question to the terminal.

Alternatively, a total of two authentication processes is carried out, one each in the data reading step and in the key reading step. Optionally, in every authentication process an extra transport key is generated, respectively as described above. Optionally, a transport key generated in the first authentication process, upon the data reading step, is employed also or only for encrypting the data key in the key reading step.

Optionally, during the first and/or second authentication process one or several session keys are agreed between the microprocessor and/or further microprocessor and the terminal, and the transport key and/or key-transport key is derived from at least one session key.

Optionally, in the—possibly respective—authentication process a mutual or unilateral authentication and Diffie-Hellman key agreement is carried out between the microprocessor and/or further microprocessor and the terminal, in particular in accordance with the PACE protocol, chapter 4.2, or in accordance with chip authentication, chapter 4.3, or in accordance with terminal authentication, chapter 4.4, of the BSI TR-03110.

An identification document according to the invention has a microprocessor, a data memory, wherein identification data are stored or storable in a form encrypted with a data key or at least in a decryptable form, and a key memory accessible for the microprocessor, wherein the data key is stored or storable, and is characterized by a long-range interface, via which a long-range radio connection can be established between the data memory and a terminal, and a short-range interface, via which a short-range radio connection can be established between the key memory and a terminal, an in that the data key or the key memory is so secured that a transmission of the data key or other data from the key memory to a terminal is possible via the short-range radio connection and is impossible via the long-range radio connection. Thereby an unnoticed spying out of the data key from the air interface, thus while the data key is being radio-transmitted, is prevented or at least strongly impeded.

The data memory is optionally firmly integrated in the identification document. Optionally, the data memory, the key memory and the microprocessor are integrated on one single chip which is coupled or couplable to the long-range interface and the short-range interface. Optionally, the data memory is accessible for the microprocessor which is also allocated to the key memory.

Optionally, the data memory and the long-range interface are arranged in an extra label attached to a main body of the identification document. The label or tag can be a pure memory RFID label without microprocessor. Alternatively, the label has a further microprocessor, wherein optionally the data memory is accessible for the further microprocessor. The label is e.g. adhesively bonded to the main body.

In the variant of the identification document with a separate label for the data memory and the key memory in the main document, the data memory and the long-range interface are constructively separated from the main document of the identification document. Thus the key memory arranged in the main document is constructively access-protected against the long-range interface. In the case that the data memory, the key memory and the microprocessor are provided in the main document, optionally on the same chip, access-protection of the key memory against the long-range interface is achieved for example on the software level or protocol level, by suitable software or suitable protocols for accessing the key memory and the data memory.

A terminal according to the invention for the contactless readout of an electronic identification document is characterized by: a long-range terminal interface via which, via the long-range interface of the identification document, a long-range radio connection can be established to the data memory of the identification document; and a short-range terminal interface, via which, via the short-range interface of the identification document, a short-range radio connection can be established to the key memory of the identification document. The short-range terminal interface has exclusive access to the key memory of the identification document, i.e. the long-range terminal interface cannot access the key memory.

BRIEF DESCRIPTION OF THE DRAWINGS

In the following the invention will be explained more closely on the basis of exemplary embodiments and with reference to the drawing, in which there are shown.

DETAILED DESCRIPTION OF VARIOUS EMBODIMENTS

Figure 1:
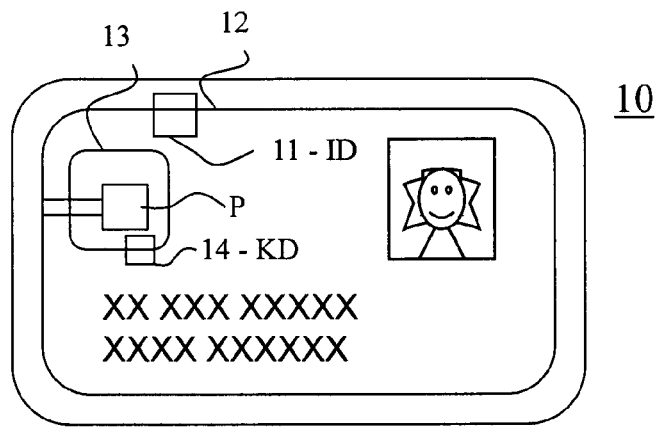
FIG. 1 an identification document according to an embodiment of the invention in a schematic representation.

FIG. 1 shows an identification document 10 (e.g. identity card) according to an embodiment of the invention, in a schematic representation. The identification document 10 has a microprocessor P, a key memory 14 coupled thereto and a data memory 11 likewise coupled thereto. In the data memory 11 identification data ID are stored in encrypted form. The identification data ID are encrypted with a symmetric data key KD. The data key KD is stored in unencrypted form in the specially secured key memory 14. The identification document 10 further has a long-range interface 12 via which a long-range radio connection can be established to a terminal 20, and a short-range interface 13 via which a short-range radio connection can be established to a terminal 20. The data key KD is so secured that a transmission of the data key KD to the terminal 20 via the short-range radio connection 13 is possible, and is impossible via the long-range radio connection 12. Via the short-range interface 13 thus a readout access to the key memory 14 is possible, whereas it is impossible via the long-range interface 12. In contrast, to the long-range interface 12 the data memory 11 is coupled, in which the encrypted identification data ID are stored. In the example of FIG. 1 the data memory 11, the key memory 14, the long-range interface 12 and the short-range interface 13 are coupled to the same and only microprocessor P of the identification document 10. The access protection of the key memory 14 against the long-range radio interface 13 is implemented inside the chip, e.g. on the protocol level or the software level.

Figure 2:
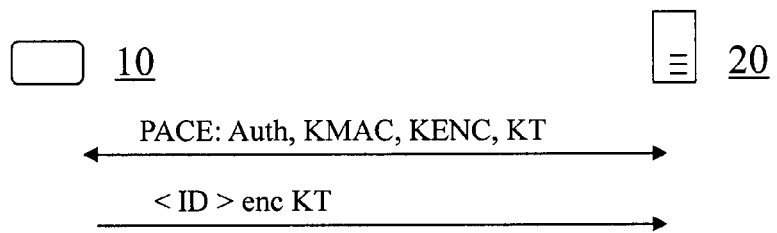
FIG. 2 a data reading step according to an embodiment of a method according to the invention.

FIG. 2 shows a data reading step according to an embodiment of a method according to the invention. The data reading step comprises an authentication process carried out via the long-range interface 12, wherein a mutual authentication and Diffie-Hellman key agreement between the microprocessor P with reference to the data memory 11 and the terminal 20 is carried out in accordance with the PACE protocol, chapter 4.2 of the BSI TR-03110. Therein two session keys KMAC, KENC are computed. By means of the authentication session key KMAC the microprocessor P and the terminal 20 mutually authenticate each other. From the second session key KENC a transport key KT is derived, with which the identification data ID from the data memory 11 are encrypted in the microprocessor P. Upon a successful terminal authentication the terminal 20 is regarded as authorized. Optionally, the encryption of the identification data ID with the transport key KT at this stage can be omitted, since the identification data ID are encrypted with the data key KD anyway. The identification data ID that are possibly encrypted with KT are transmitted by the microprocessor 11 via the long-range interface 12 to the terminal 20 and possibly decrypted with KT at the terminal 20. The decrypted identification data ID are still encrypted with the data key KD.

Figure 3:
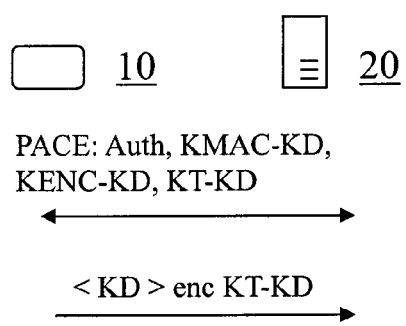
FIG. 3 a key reading step according to an embodiment of a method according to the invention.

FIG. 3 shows a key reading step according to an embodiment of a method according to the invention. The key reading step comprises an authentication process carried out via the short-range interface 13, wherein a mutual authentication and Diffie-Hellman key agreement is carried out between the microprocessor P and the terminal 20, according to the PACE protocol, chapter 4.2 of the BSI TR-03110. Therein two session keys KMAC-KD, KENC-KD are computed. By means of the authentication session key KMAC-KD the terminal 20 and the microprocessor P mutually authenticate each other with reference to the key memory 14. From the second session key KENC-KD a second transport key KT-KD is derived, with which the data key KD from the key memory 14 is encrypted by the microprocessor P under the control of the microprocessor P. The data key KD encrypted with the transport key KT-KD is transmitted by the microprocessor P via the short-range interface 12 to the terminal 20 and decrypted at the terminal 20.

Now the terminal decrypts the encrypted identification data ID with the decrypted data key KD.

Figure 4:
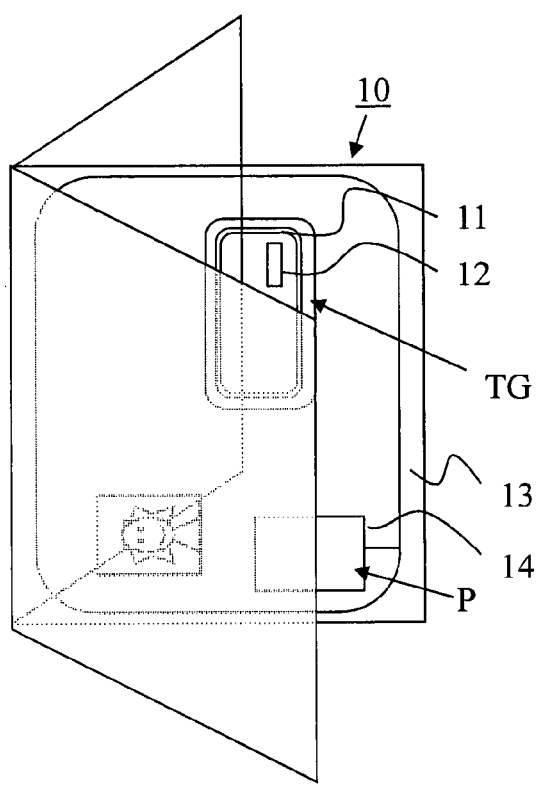
FIG. 4 an electronic passport according to an embodiment of the invention.

FIG. 4 shows in a schematic representation an electronic passport having a data page 10 as identification document 10 according to an embodiment of the invention. The data page 10 has a microprocessor chip P with an integrated key memory 14 and a short-range contactless interface (radio interface) 13, via which the data key KD stored in the key memory 14 can be read out after successful authentication.

On a surface of the data page 10 a UHF-RFID label TG is adhesively attached, having a long-range contactless interface (antenna) 13 and a data memory 11 coupled with the long-range contactless interface (antenna) 13, in which data memory encrypted identification data ID are stored, said identification data being encrypted with the symmetric data key KD stored in the key memory 14. The UHF-RFID label TG does not have a microprocessor in the example from FIG. 4 and is thus a pure memory label. Alternatively, the UHF-RFID label TG can additionally have a microprocessor P-2 of its own.

The invention claimed is:

1. A method for the contactless readout of an electronic identification document by means of a terminal;
wherein the identification document comprises:
a microprocessor;
a data memory, wherein identification data are stored in encrypted form, decryptable with a data key; and
a key memory that is physically separate from the data memory, and that is accessible for the microprocessor and wherein the data key is stored;
wherein in the method,
in a data reading step the encrypted identification data are transmitted from the data memory of the identification document to the terminal,
in a key reading step the data key is transmitted from the key memory of the identification document to the terminal, and
in a decryption step in the terminal the identification data are decrypted with the data key;
wherein the data reading step is carried out employing a long-range radio connection, and the key reading step is carried out employing a short-range radio connection, wherein in the key reading step, before the data key is transmitted to the terminal, a second authentication process is carried out, wherein at least one authentication is carried out between the microprocessor chip and the terminal, and further a key-transport key is computed for encrypting the data key that is to be transmitted to the terminal, and the data key is encrypted with the key-transport key;
wherein the key reading step carried out on the short-range radio connection is performable independent of performance of the data reading step carried out on the long-range radio connection, and
wherein the short-range radio connection has exclusive access to the key memory of the identification document, preventing any access of the key memory using the long-range radio connection.

2. The method according to claim 1, wherein as long-range radio connection a radio connection with a range from the area of approximately 1 meter to approximately a few hundred meters is provided and/or with an operating frequency from the area of approximately 0.3 GHz to approximately 10 GHz.

3. The method according to claim 1, wherein as short-range radio connection a radio connection with a range from the area of approximately 1 centimeter to approximately 15 centimeters is provided and/or with an operating frequency from the area of approximately 3 MHz to approximately 20 GHz.

4. The method according to claim 1, wherein the data memory is accessible for the microprocessor or a further microprocessor, and
in the data reading step, before the identification data are transmitted to the terminal, a first authentication process is carried out, wherein at least one authentication is carried out between the microprocessor and the terminal or the further microprocessor and the terminal, and further a transport key is computed for encrypting the identification data to be transmitted, and the identification data are encrypted with the transport key.

5. The method according to claim 1, wherein during a first and/or second authentication process one or several session keys are agreed between the microprocessor and/or further microprocessor and the terminal, and from at least one session key the transport key and/or key-transport key is derived.

6. The method according to claim 5, wherein in the authentication process a mutual or unilateral authentication and Diffie-Hellman key agreement is carried out between the microprocessor chip and/or further microprocessor and the terminal, in accordance with the PACE protocol, chapter 4.2, or in accordance with chip authentication, chapter 4.3, or in accordance with terminal authentication, chapter 4.4, of the BSI TR-03110.

7. An identification document comprising:
a microprocessor;
a data memory, wherein identification data are stored or storable in encrypted form, decryptable with a data key; and
a key memory that is physically separate from the data memory, and is accessible for the microprocessor, wherein the data key is stored or storable;
wherein a long-range interface, via which a long-range radio connection can be established between the data memory and a terminal, and a short-range interface, via which a short-range radio connection can be established between the key memory and a terminal wherein establishing the short-range radio connection is performable independent of establishing the long-range radio connection;
wherein the data key or key memory is so secured that a transmission of the data key from the key memory to a terminal is possible via the short-range radio connection, wherein before the data key is transmitted to the terminal, a second authentication process is carried out, wherein at least one authentication is carried out between the microprocessor and the terminal, and further a key-transport key is computed for encrypting the data key that is to be transmitted to the terminal, and the data key is encrypted with the key-transport key; and
wherein the short-range radio connection has exclusive access to the key memory of the identification document, preventing access of the key memory using the long-range radio connection.

8. The identification document according to claim 7, wherein the data memory is firmly integrated in the identification document, the key memory and the microprocessor are integrated on one single chip.

9. The identification document according to claim 7, wherein the data memory and the long-range interface are arranged in an extra label attached to a main body of the identification document, wherein the label has a further microprocessor, wherein the data memory is accessible for the further microprocessor.

10. A terminal for the contactless readout of an electronic identification document according to claim 7, wherein
a long-range terminal interface via which, using the long-range interface of the identification document, a long-range radio connection can be established to the data memory of the identification document, and
a short-range terminal interface, via which, via the short-range interface of the identification document, a short-range radio connection can be established to the key memory of the identification document.

\* \* \* \* \*